Figures 1, 2, 3:
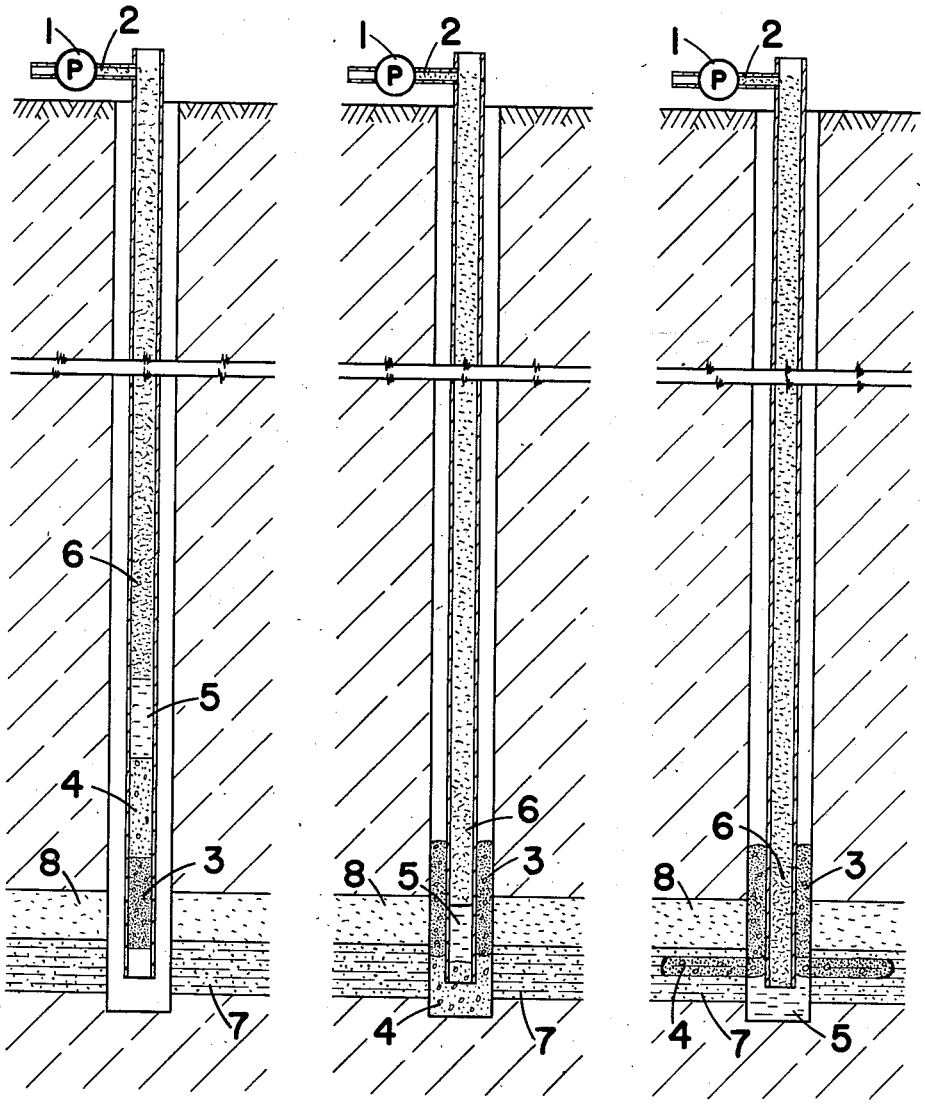

July 2, 1940.  G. E. CANNON  2,206,389
METHOD OF CEMENTING WELLS
Filed Sept. 27, 1939

George E. Cannon INVENTOR.
BY
ATTORNEY.

Patented July 2, 1940

2,206,389

UNITED STATES PATENT OFFICE 2,206,389

METHOD OF CEMENTING WELLS

George E. Cannon, Houston, Tex., assignor to Standard Oil Development Company, a corporation of Delaware Application September 27, 1939, Serial No. 296,818

7 Claims. (Cl. 166—21)

The present invention relates to a process for cementing wells.

More particularly, the invention relates to a process for squeezing a layer of cement into the formation adjacent the bore hole at the interface between the gas cap and the oil level in an oil well.

In many oil fields a gas cap overlies the oil formation. In completing oil wells by conventional methods in such formations the oil produced may contain an abnormally high gas-oil ratio. This is wasteful in that energy from the reservoir is dissipated without doing useful work in raising oil to the surface. A high gas-oil ratio is not only harmful in itself, but quite often it causes the well to be closed down by governmental authorities under proration orders.

In fields having a gas cap overlying the oil producing formation it is conventional to cement the casing in the well and then perforate the casing at the contact plane between the gas and oil. A cement retainer is then set in the casing at a point below the perforations and a mixture of cement pumped down into the well and squeezed out through the perforations so that it spreads out through the formation at the point of the gas and oil contact, forming a seal. In this manner the gas cap exerts a pressure on the oil and forces it up out of the well instead of channeling down and being produced with the oil. Oil produced in this manner has a normal oil-gas ratio since the cement squeezed out into the formation prevents gas from seeping down into the oil and being produced in excessive quantities with the oil.

In accordance with the present invention cement may be squeezed out into the formation at the desired point along the bore hole at the same time that the casing is being cemented. This improvement will now be described in connection with the drawing in which Figs. 1, 2 and 3 are sectional views of an oil well showing the steps used in carrying out the invention.

The squeezing of the cement into the formation is accomplished by using two different batches of cement, a slow set cement and a fast set cement. The terms "slow set cement" and "fast set cement" as used in the description of the present invention are only relative expressions and simply means that one of the batches of cement sets at a faster rate than does the other batch of cement. The fast setting cement may be either ordinary Portland cement or Portland cement treated with calcium chloride or any other common accelerator, or it may be gypsum cement. The slow setting cement may be any of the commercial slow setting cements now on the market which are well known to the art.

As shown in Fig. 1 a batch of fast setting cement is pumped by pump 1 through a line 2 attached to the upper end of the casing and into the casing and following this batch of fast setting cement a batch of slow setting cement is pumped into the casing. In Fig. 1 the batch of fast setting cement designated by numeral 3 is shown at the bottom of the casing while directly above this cement is shown a batch of slow setting cement 4. These batches of cement are followed by a short column of water 5 and a column of drilling mud 6, as is conventional in pumping cement into a casing for the purpose of cementing the well.

In Fig. 1 the oil producing formation is designated by numeral 7, while above this oil is the gas cap designated by numeral 8. The pumping of the cement is continued until it passes out of the bottom of the casing and upwardly in the annular space between the casing and the bore hole until the fast setting cement is at the interface between the gas cap and the oil producing formation. This is shown by Fig. 2 in which it will be seen that the fast setting cement has reached a position in a bore hole opposite the interface between the gas and oil while the slow setting cement is in the annular space below the fast setting cement.

When the cement has reached the position shown by Fig. 2, the pumping is stopped and the cement is allowed to stay in this position until the fast setting cement has set. After this time interval has passed the pumping is then resumed and, since the slow setting cement has its flow barred by the plug of the fast setting cement, it cannot travel upwardly and the pressure behind it forces it out into the formation. The cement is squeezed out into the formation below the point of contact between the gas cap and the oil and assumes a position somewhat like that shown in Fig. 3, forming an effective seal between th gas and oil of a substantial distance around the wall of the bore hole.

From the above description it will be evident that I have cemented the casing and squeezed cement into the formation to reduce the gas-oil ratio in one single operation. It will be apparent that by accomplishing this result in a single operation a substantial saving of time is effected and, in addition, the expensive step of perforating the casing is eliminated.

Modifications of the present invention will be obvious to a skilled worker and while I have described the preferred procedure I do not intend to be limited thereto, but wish to claim my invention as broadly as the prior art permits.

I claim:

1. A process of cementing a casing comprising the steps of allowing a mixture of fast setting cement to form a plug in the annular space between the casing and the bore hole at substantially the plane of gas and oil contact in the well and subsequently forcing slow setting cement into the formation at a point below the plug of fast setting cement.

2. In the cementing of oil wells the step of forcing a batch of fast setting cement into the annular space between the casing and the bore hole and following the fast setting cement by a batch of slow setting cement.

3. In the process of cementing oil wells the step of forcing a batch of fast setting cement followed by a batch of slow setting cement down the casing and up into the annular space between the casing and the bore hole until the fast setting cement reaches the gas-oil contact of the well, allowing the cement mixture to remain dormant until the fast setting cement has set, applying pressure to the slow setting cement, and forcing it out into the formation.

4. In the cementing of a well the steps of forming a plug in the well, at substantially the interface between oil and gas zones followed by the step of forcing slow setting cement into the formation at substantially the location of the first formed plug.

5. A process in accordance with claim 3 in which the fast setting cement is Portland cement.

6. A process in accordance with claim 3 in which the fast setting cement is gypsum cement.

7. In the completion of a well the step of forming a seal between two zones penetrated by the bore hole comprising the steps of forming a plug of fast setting cement in the bore hole at substantially the location of the boundary between the two zones and subsequently forcing slow setting cement into the formations at substantially the location of the plug of fast setting cement.

GEORGE E. CANNON.